United States Patent
Spyrou et al.

(10) Patent No.: US 8,729,259 B2
(45) Date of Patent: May 20, 2014

(54) METHOD FOR PRODUCING 1:1 ADDUCTS HAVING A LOW MONOMER CONTENT FROM HYDROXYALKYL(METH)ACRYLATES AND DIISOCYANATES

(75) Inventors: Emmanouil Spyrou, Schermbeck (DE); Stephan Kohlstruk, Duelmen (DE); Lars Hellkuhl, Gescher (DE); Heinz Grosse-Beck, Bottrop (DE); Marita Druener, Reken (DE)

(73) Assignee: Evonik Degussa GmbH, Essen (DE)

( * ) Notice: Subject to any disclaimer, the term of this patent is extended or adjusted under 35 U.S.C. 154(b) by 242 days.

(21) Appl. No.: 13/201,469

(22) PCT Filed: Feb. 8, 2010

(86) PCT No.: PCT/EP2010/051466
§ 371 (c)(1),
(2), (4) Date: Aug. 15, 2011

(87) PCT Pub. No.: WO2010/115644
PCT Pub. Date: Oct. 14, 2010

(65) Prior Publication Data
US 2011/0301345 A1 Dec. 8, 2011

(30) Foreign Application Priority Data
Apr. 9, 2009 (DE) .......................... 10 2009 002 301

(51) Int. Cl.
*C09D 175/16* (2006.01)
*C07D 229/00* (2006.01)
*C07C 69/00* (2006.01)

(52) U.S. Cl.
USPC .......................................... 540/202; 560/129

(58) Field of Classification Search
None
See application file for complete search history.

(56) References Cited

U.S. PATENT DOCUMENTS

| 4,397,707 A * | 8/1983 | Dawdy ....................... 156/307.5 |
| 2002/0049349 A1 | 4/2002 | Kohlstruck et al. |
| 2006/0052527 A1 | 3/2006 | Weikard et al. |
| 2010/0130675 A1 * | 5/2010 | Panther ........................ 524/589 |

FOREIGN PATENT DOCUMENTS

| DE | 198 00 528 | 7/1999 |
| EP | 1 179 555 | 2/2002 |
| EP | 1 634 903 | 3/2006 |

OTHER PUBLICATIONS

International Search Report issued Apr. 20, 2010 in PCT/EP10/51466 filed Feb. 8, 2010.

* cited by examiner

*Primary Examiner* — Sun Jae Yoo
(74) *Attorney, Agent, or Firm* — Oblon, Spivak, McClelland, Maier & Neustadt, L.L.P.

(57) ABSTRACT

The present invention relates to the production and the use of 1:1 adducts having a low monomer content from hydroxyalkyl(meth)acrylates and diisocyanates.

19 Claims, No Drawings

METHOD FOR PRODUCING 1:1 ADDUCTS HAVING A LOW MONOMER CONTENT FROM HYDROXYALKYL(METH)ACRYLATES AND DIISOCYANATES

This invention relates to the preparation and the use of low-monomer-content 1:1 adducts of hydroxyalkyl(meth)acrylates and diisocyanates.

The monoadducts (1:1 adducts) of hydroxy(meth)acrylates and diisocyanates, on account of their inherent heterofunctionality, are valuable synthesis building blocks with a diversity of possible uses. Fields of application are situated, for example, in the area of the preparation of acrylic-functionalized derivatives containing urethane groups, by reaction of the isocyanate group with monofunctional reagents, or the preparation of corresponding acrylic-functionalized, UV-curable resins, by reaction of the isocyanate group with polyfunctional reactants. Also possible is the preparation of polyisocyanates by, for example, free-radically initiated homopolymerization or copolymerization of the (meth)acrylic group. The readiness of the NCO groups in such polymers to react enables easy access under mild conditions to tailor-made polymers with a unique profile of properties.

The use of isocyanates with olefinic double bonds has already often been described in the patent literature—for example, for the production of crosslinkers (DE 35 01 493) and self-crosslinking systems (U.S. Pat. No. 4,861,853), including water-based systems (EP 519 513).

1:1 adducts of diisocyanates and hydroxyalkyl(meth)acrylates are obtained conventionally by reaction of the reactants in a molar ratio of 1:1 (ratio of NCH/OH groups=2:1). The product of this process is inevitably a mixture of heterofunctional monoadduct (1:1 adduct) bisadduct (1:2 adduct), and residual monomer (free diisocyanate), in a ratio of approximately 1:2:1. By using an excess of diisocyanate it is possible to restrain the bisadduct content of the mixture. This comes at the expense of an increase in the fraction of residual monomer. When an excess of hydroxyalkyl(meth)acrylate is used, the opposite effect comes about. As diacrylates, in contrast to the corresponding monoadduct, the bisadducts no longer fulfill the desired criterion of heterofunctionality. They lessen the quality of the monoadduct and also remain not without effect on the quality and the pattern of properties of the desired end products. The same considerations also apply to the excess starting diisocyanate that remains in the adduct. Furthermore, diisocyanates are very reactive compounds. For this reason, representatives of this class of substance are classed as toxic. As a matter of principle, therefore, a high residual monomeric diisocyanate content should be avoided in the product.

EP 1 179 555 describes the preparation of low-monomer-content adducts of this kind from hydroxyalkyl(meth)acrylates and diisocyanates, by removal of the monomers by means of a short-path distillation under very specific conditions: during the short-path distillation, polymerization-inhibiting gases must be present at sufficient concentration. This is indeed technically possible, but is very costly and inconvenient, and also harbors the risk of polymerization of the product within the short-path distillation column, if carried out incorrectly, thereby necessitating a considerable cleaning effort. The diisocyanates used do not contain uretdione groups.

An object, therefore, was to find a process which does not entail the disadvantages of the existing processes, i.e., high monomer content, high bisadduct content, tendency to polymerization during distillative removal of monomeric diisocyanates, and which in particular without special technical cost and complexity allows access to low-monomer-content 1:1 adducts of hydroxyalkyl(meth)acrylates and diisocyanates.

Surprisingly it has been found that low-monomer-content 1:1 adducts of hydroxyalkyl(meth)acrylates and diisocyanates are obtainable by simple heating of adducts of uretdione-group-containing diisocyanates and hydroxyalkyl(meth)acrylates, without any unwanted instances of polymerization occurring.

The invention accordingly provides a process for preparing low-monomer-content 1:1 adducts of hydroxyalkyl(meth)acrylates and diisocyanates by the following steps:
1. reacting a uretdione-group-containing dimer of a diisocyanate with a hydroxyalkyl(meth)acrylate, with complete reaction of the free NCO groups, in a ratio of free NCO groups to OH groups of 1:1.0 to 1.3,
2. heating this product from 1. to temperatures of 100-240° C., thereby cleaving the uretdione groups to form the 1:1 adduct.

The invention also provides for the use of the low-monomer-content 1:1 adducts of hydroxyalkyl(meth)acrylates and diisocyanates in binders and coating compositions, more particularly in formulations as coating, sealant or adhesive compositions for the coating, adhesive bonding or sealing of metal, plastics, glass, wood, MDF (middle density fiber) or leather substrates or other substrates.

Polyisocyanates containing uretdione groups are well-known and are described in U.S. Pat. No. 4,476,054, U.S. Pat. No. 4,912,210, U.S. Pat. No. 4,929,724, and EP 417 603, for example. A comprehensive overview of industrially relevant processes for the dimerization of isocyanates to uretdiones is given by J. Prakt. Chem. 336 (1994) 185-200. In general, the reaction of isocyanates to form uretdiones takes place in the presence of soluble dimerization catalysts, such as dialkylaminopyridines, trialkylphosphines, phosphoramides or imidazoles, for example. The reaction—carried out optionally in solvents, but preferably in the absence of solvents—is halted by addition of catalyst poisons when a desired conversion has been reached. Depending on the diisocyanate used, the conversion ought not to be higher than about 20%, preferably 15%, since otherwise the concentration of free diisocyanate is too great, owing to formation of oligomers after cleavage of the uretdione. Excess monomeric diisocyanate is removed afterward by short-path evaporation. The short-path distillation is carried out at 80-220° C./0.1-20 mbar. The temperature and the reduced pressure are governed by the viscosity behavior of the products in question. The short-path evaporator may be a glass or else metal apparatus. If the catalyst is sufficiently volatile, the reaction mixture can be freed from the catalyst in the course of the removal of monomer. In that case there is no need to add catalyst poisons. In principle, a broad range of isocyanates are suitable for preparing the uretdione-group-containing diisocyanates. In accordance with the invention it is preferred to use isophorone diisocyanate (IPDI), hexamethylene diisocyanate (HDI), 2,2'-dicyclohexylmethane diisocyanate/2,4'-dicyclohexylmethane diisocyanate, 4,4'-dicyclohexylmethane diisocyanate ($H_{12}$MDI), 2-methylpentane diisocyanate (MPDI), 2,2,4-trimethylhexamethylene diisocyanate and/or 2,4,4-trimethylhexamethylene diisocyanate (TMDI), norbornane diisocyanate (NBDI), alone or in mixtures. Very particular preference is given to using IPDI, $H_{12}$MDI, and HDI. The uretdione-group-containing diisocyanates used in step 1. in accordance with the invention are dimmers of a diisocyanate with a uretdione group, of the formula I below

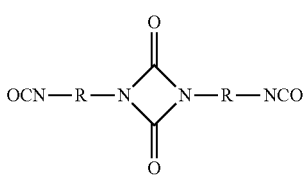

R=radical of the diisocyanate used

Suitable hydroxyalkyl(meth)acrylates are all compounds which carry not only at least one methacrylate or acrylate function but also exactly one hydroxyl group. Further constituents may be aliphatic, cycloaliphatic, aromatic or heterocyclic alkyl groups. Oligomers or polymers are conceivable as well.

Preference is given to readily available products such as, for example, hydroxyethyl acrylate, hydroxypropyl acrylate, hydroxybutyl acrylate, and hydroxyethyl methacrylate, hydroxypropyl methacrylate, hydroxybutyl methacrylate, glyceryl diacrylate, pentaerythrityl triacrylate, trimethylolpropane diacrylate, glyceryl dimethacrylate, pentaerythrityl trimethacrylate and trimethylolpropane dimethacrylate. Particularly preferred is hydroxybutyl acrylate. Mixtures can of course also be used.

Step 1

In the first step of the process, a uretdione-group-containing diisocyanate (I) is reacted with a hydroxyalkyl(meth)acrylate, the molar ratio being 1:2 to 1:2.6. The NCO/OH group ratio, accordingly, is 1:1.0 to 1:1.3, preferably 1:1.0 to 1:1.1, more preferably 1:1. Depending on the oligomer purity of the uretdione-group-containing diisocyanate (dimer), it may be advantageous to add somewhat more than the stoichiometric amount of hydroxyalkyl(meth)acrylate, since cleavage of the oligomers produces free diisocyanates whose reaction with excess hydroxyalkyl(meth)acrylate is sensible.

The reaction of these uretdione-group-bearing diisocyanates (I) with hydroxyalkyl(meth)acrylates entails the reaction of the free NCO groups with hydroxyl groups, and has already often been described (EP 669 353, EP 669 354, DE 30 30 572, EP 639 598 or EP 803 524).

The reaction may take place in an inert (free from alcohol, amino, thiol, and acid groups) solvent, such as acetone, methyl ethyl ketone, tetrahydrofuran, ethyl acetate, butyl acetate or toluene, for example. Preferred solvent is ethyl acetate and acetone. Moreover, the reaction may take place with and without urethanization catalysts, preferably with catalysts such as dibutyltin dilaurate (DBTL), bismuth neodecanoate, zinc octoate, diazabicyclooctane (DABCO), tertiary amines. The reaction takes place at temperatures from 40° C. to 80° C., and so only the free NCO groups of the uretdione-group-containing diisocyanate (I) react with the OH groups, and the uretdione group present is not cleaved back into free NCO groups.

The reaction time is variable, since it is essential to the invention that the reaction takes place with complete reaction of the free NCO groups with the OH groups. Complete reaction means that the reaction product prepared in step 1. has a free NCO group content of 0% to 0.5% by weight. Any excess of hydroxyalkyl(meth)acrylate can be comfortably removed at this point by distillation, as for example by short-path distillation at temperatures below 100° C.

Suitable reaction assemblies include all customary apparatus, tanks, static mixers, extruders, and so on, preferably those which possess a mixing function or stirring function.

The solvent, where used, is removed at the end of the reaction, preferably by distillation, such as by means of rotary evaporators, short-path evaporators, thin-film evaporators or other gentle distillation techniques, for example.

The resultant reaction product is an adduct of the OH groups of two molecules of hydroxyalkyl(meth)acrylate with the two terminal, i.e., free, NCO groups of the uretdione-group-containing diisocyanate (I).

The presence of typical polymerization inhibitors, referred to as antioxidants, is advantageous as early as during the first step (NCO—OH reaction). Examples of suitable antioxidants include pyrocatechol, 4-methoxy-phenol, 4-tert-butyloxyphenol, 4-benzyloxyphenol, α-naphthol, β-naphthol, phenothiazine, 10,10-dimethyl-9,10-dihydroacridine, bis[2-hydroxy-5-methyl-3-cyclo-hexylphenyl]methane, bis[2-hydroxy-5-methyl-3-tert-butylphenyl]methane, hydroquinone, pyrogallol, 3,4-dihydroxy-1-tert-butylbenzene, 4-methoxy-2(or 3)-tert-butylphenol (BHA), BHA also in combination with bis[2-carboxyethyl]sulfide (TDPA), 4-methyl-2,6-di-tert-butylphenol (BHT), bis[4-hydroxy-2-methyl-5-tert-butyl-phenyl]sulfide, 4-butylmercaptomethyl-2,6-di-tert-butylphenol, dioctadecyl 4-hydroxy-3,5-di-tert-butyl-phenylmethanesulfonate, 2,5-dihydroxy-1-tert-butylbenzene, 2,5-dihydroxy-1,4-di-tert-butylbenzene, 3,4-dihydroxy-1-tert-butylbenzene, and 2,3-dimethyl-1,4-bis[3,4-dihydroxyphenyl]butane, and also mixtures of these inhibitors.

The phenolic antioxidants can also be combined with phosphorous esters of formula II, where X is oxygen or sulfur, and where $R^1$, $R^2$, and $R^3$ represent identical or different alkyl, alkylen-(1)-yl, aryl or aralkyl radicals having in each case 1-20 C atoms.

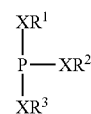

The phenolic antioxidants can also be combined with thioethers or amines, such as 2-anilinonaphthalene (PBN), 1-anilinonaphthalene (PAN) or 1,4-dianilino-benzene, for example. It is naturally also possible to use commercial substances which on account of their chemical construction combine a plurality of polymerization-inhibiting principles, such as 2,2'-thiobis(4-tert-octylphenol), for example. Employed with preference are phenothiazine, 2,6-di-tert-butyl-4-(4,6-bis(octylthio)-1,3,5-triazin-2-ylaminophenol and 4-methyl-2,6-di-tert-butyphenol, and 4,4'-methylenebis-2,6-di-tert-butylphenol.

Antioxidants of these kinds are used preferably in step 1, but in principle may also be used only in step 2.

It has proven advantageous to pass air or other oxygen-containing gases over the reaction mixture during step 1.

Step 2

In the second step of the process, the uretdione group of the adduct from the first step is then cleaved to form free NCO groups, with formation of two low-monomer-content 1:1 adducts of one molecule of diisocyanate and one molecule of hydroxyalkyl(meth)acrylate.

If the reaction has been carried out in a solvent, this solvent is removed before the uretdione groups are cleaved. Cleavage of the uretdione groups takes place at temperatures between 100 and 240° C., preferably between 130 and 180° C. Suitable reaction assemblies include all customary apparatus, such as tanks, static mixers, extruders, and so on, preferably those which possess a mixing function or stirring function. The time may amount, depending on temperature, to between a few minutes and several days. The progress of the cleavage is monitored titrimetrically via the determination of the free NCO groups. Cleavage is continued for as long as the free NCO content is rising, and is thereafter terminated by cooling.

It has proven advantageous to pass air or other oxygen-containing gases over the reaction mixture during the second step.

The monomeric 1:1 adducts obtained in accordance with the invention have a monomeric diisocyanate content of less than 1% by weight, preferably less than 0.5% by weight. Monomeric hydroxyalkyl(meth)acrylate is not left remaining, since any excess after the first step reacts completely with the NCO groups now liberated.

The present invention here is elucidated below, but not restricted, by examples.

EXAMPLES

1. Preparation of the Uretdione (I)

2000 g of IPDI were admixed with 4 g of dimethylaminopyridine and the mixture was stirred at room temperature for 6 days. It was subsequently distilled in a short-path evaporator at 0.1 mbar and 145° C. The throughput was 150 ml/h. The residue of the uretdione-group-containing dimeric diisocyanate (309 g/15.6%) had a free NCO content of 18.1% by weight.

2. Reaction or Uretdione (I) with Hydroxyalkyl(Meth)Acrylates (Process Step 1.)

Of the uretdione-group-containing dimeric diisocyanate (I) under 1., 232 g (1 equivalent of NCO) were dissolved in one liter of ethyl acetate. Then 2.4 g of 4-methyl-2,6-di-tert-butylphenol (BHT) and 0.04 g of dibutyltin dilaurate were added. The mixture was then heated to 60-70° C. and admixed dropwise with 159 g (1 equivalent of OH) of hydroxybutyl acrylate (NCO/OH ratio=1:1). After the end of the addition, stirring was continued at this temperature until conversion of the free NCO groups was complete. Throughout the time a gentle stream of air was passed over the solution. The reaction was at an end after 6 hours (NCO content<0.2% by weight). The solvent was removed completely on a rotary evaporator.

3. Cleavage of the Uretdione Groups (Process Step 2.)

The product from 2. was heated with stirring in a round-bottomed flask (3a: 140° C., 3b: 170° C.) while dry air was passed over the product. The NCO content was measured after a certain time:
3a) with a heating temperature of 140° C., the NCO content after 17 hours was 7.9% by weight (72% of theory). The IPDI monomer content of the low-monomer-content 1:1 adduct prepared by the process of the invention was 0.9% by weight.
3b) with a heating temperature of 170° C., the NCO content after 1.5 hours was 8.8% by weight (80% of theory). The IPDI monomer content of the low-monomer-content 1:1 adduct prepared by the process of the invention was 0.8% by weight.

At both temperatures there were no gel particles formed—in other words, there is no polymerization taking place under these conditions.

The invention claimed is:

1. A process for preparing at least one low-monomer-content 1:1 adduct of at least one hydroxyalkyl(meth)acrylate and at least one diisocyanate, the process comprising:
   (1) reacting a uretdione-group-comprising dimer of a diisocyanate with a hydroxyalkyl(meth)acrylate, with complete reaction of the free NCO groups, in a ratio of free NCO groups to OH groups of 1:1.0 to 1.3, to give a first product; and
   (2) heating the first product from (1) to a temperature in a range of 100 to 240° C., thereby cleaving at least one uretdione group to form the 1:1 adduct.

2. The process of claim 1, wherein reacting (1) takes place in a solvent selected from the group consisting of acetone, methyl ethyl ketone, tetrahydrofuran, ethyl acetate, butyl acetate, and toluene.

3. The process of claim 1, wherein the reacting (1) takes place in the presence of at least one catalyst.

4. The process of claim 1, wherein at least one selected from the group consisting of reacting (1) and the heating (2) takes place in the presence of at least one antioxidant.

5. The process of claim 1, further comprising:
   distillatively removing the hydroxyalkyl(meth)acrylate reacting (1).

6. The process of claim 1, wherein a reaction product prepared in (1) has a free NCO group content of 0% to 0.5% by weight.

7. The process of claim 1, wherein reacting (1) takes place at a temperature in a range of 40° C. to 80° C.

8. The process of claim 1, wherein the diisocyanate comprises at least one selected from the group consisting of isophorone diisocyanate (IPDI), hexamethylene diisocyanate (HDI), 2,2'-dicyclohexylmethane diisocyanate, 2,4'-dicyclohexylmethane diisocyanate, 4,4'-dicyclohexylmethane diisocyanate ($H_{12}$MDI), 2-methylpentane diisocyanate (MPDI), 2,2,4-trimethylhexamethylene diisocyanate, 2,4,4-trimethylhexamethylene diisocyanate (TMDI), and norbornane diisocyanate (NBDI).

9. The process of claim 1, wherein the hydroxyalkyl(meth) acrylate comprises at least one selected from the group consisting of hydroxyethyl acrylate, hydroxypropyl acrylate, hydroxybutyl acrylate, hydroxyethyl methacrylate, hydroxypropyl methacrylate, hydroxybutyl methacrylate, glyceryl diacrylate, pentaerythrityl triacrylate, trimethylolpropane diacrylate, glyceryl dimethacrylate, pentaerythrityl trimethacrylate, and trimethylolpropane dimethacrylate.

10. The process of claim 1, wherein the cleaving of the at least one uretdione group in the heating (2) takes place at a temperature in a range between 100 and 240° C.

11. The process of claim 1, wherein the at least one monomeric 1:1 adduct has a monomeric diisocyanate content of less than 1% by weight.

12. The process of claim 1, wherein at least one selected from the group consisting of air and an oxygen-comprising gas is passed over a reaction mixture during at least one selected from the group consisting of the reacting (1) and the heating (2).

13. The process of claim 1, wherein the reacting (1) takes place in a solvent selected from the group consisting of acetone and ethyl acetate.

14. The process of claim 1, wherein the reacting (1) takes place in the presence of at least one catalyst selected from the group consisting of dibutyltin dilaurate (DBTL), zinc octoate, diazabicyclooctane (DABCO), and a further tertiary amine.

15. The process of claim 1, wherein the reacting (1) takes place in the presence of at least one catalyst selected from the group consisting of DBTL and DABCO.

16. The process of claim 1, wherein the diisocyanate comprises at least one selected from the group consisting of IPDI, HDI, and $H_{12}$MDI.

17. The process of claim 1, wherein the hydroxyalkyl (meth)acrylate comprises at least one selected from the group consisting of hydroxybutyl acrylate.

18. The process of claim 1, wherein the cleaving of the at least one uretdione group in the heating (2) takes place at a temperature in a range between 130 and 180° C.

19. The process of claim 1, wherein the reacting (1) takes place in a solvent comprising ethyl acetate.

* * * * *